United States Patent [19]

Manner

[11] 3,930,662
[45] Jan. 6, 1976

[54] CHAIR AND HAND TRUCK COMBINATION

[76] Inventor: Thomas D. Manner, 1491 Bells Ferry Road, Marietta, Ga. 30060

[22] Filed: Mar. 13, 1974

[21] Appl. No.: 450,570

[52] U.S. Cl. .............................. 280/36 C; 297/39
[51] Int. Cl.² ........................................ B62B 1/20
[58] Field of Search ............ 280/36 C, 47.24, 47.27; 297/193, 39, 60, DIG. 4

[56] References Cited
UNITED STATES PATENTS

| | | | |
|---|---|---|---|
| 2,065,233 | 12/1936 | Mallett | 280/47.25 X |
| 2,472,407 | 6/1949 | David et al. | 297/60 X |
| 3,031,228 | 4/1962 | Tydor | 297/39 X |
| 3,061,365 | 10/1962 | Frieberg | 297/39 |
| 3,191,959 | 6/1965 | Heimbruch et al. | 280/36 C |
| 3,230,006 | 1/1966 | Sokolis | 297/193 |
| 3,251,495 | 5/1966 | Paton | 280/47.27 |
| 3,290,089 | 12/1966 | Farrell | 297/39 |
| 3,677,573 | 7/1972 | Chin | 280/47.24 X |
| 3,827,707 | 8/1974 | Bierman | 280/36 C |

Primary Examiner—Leo Friaglia
Assistant Examiner—Michael J. Forman
Attorney, Agent, or Firm—Newton, Hopkins & Ormsby

[57] ABSTRACT

A chair and hand truck combination is disclosed comprising a platform upon which a load may be set and removed, a pair of wheels partially supporting the platform, a back rest extending upwardly from the platform, and a pair of arm rests extending above the platform from the back rest.

6 Claims, 3 Drawing Figures

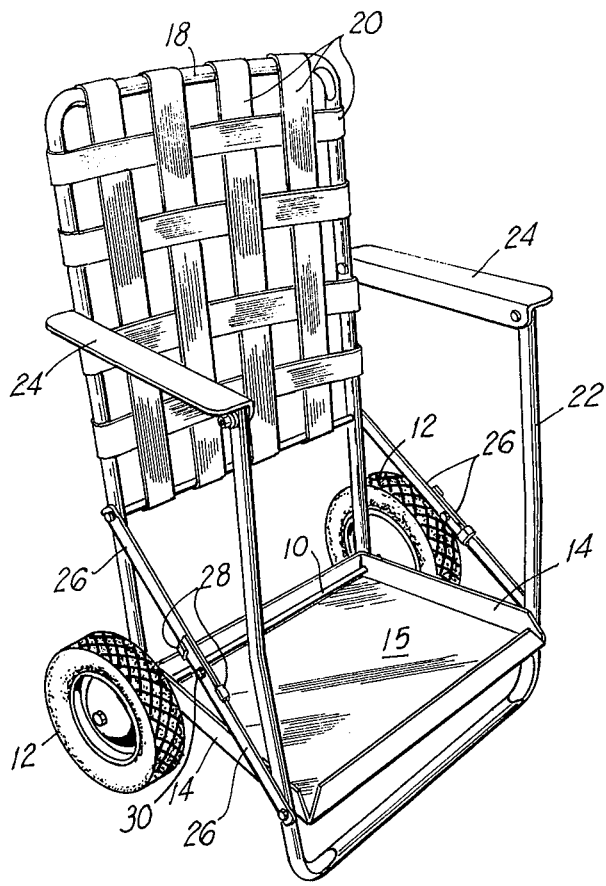
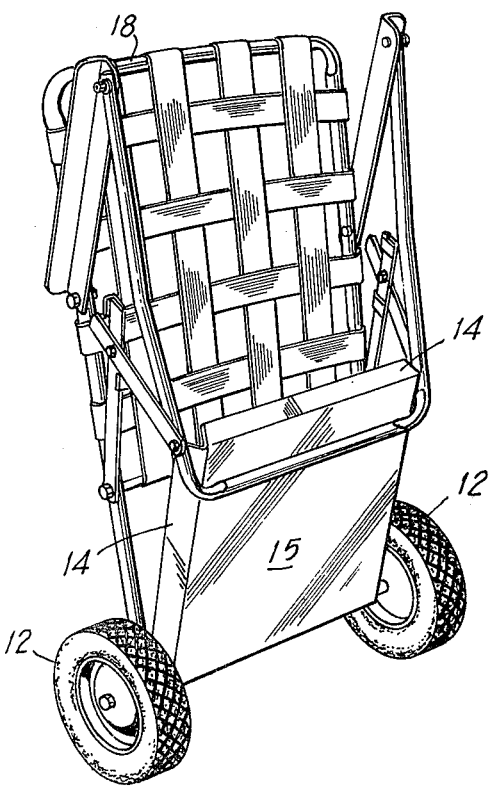

3,930,662

CHAIR AND HAND TRUCK COMBINATION

BACKGROUND OF THE INVENTION

This invention relates to structures which serve both as a chair and as a hand truck.

Heretofore, structures have been devised which function both as a portable chair and as means for transporting articles from one location to another. For example, in U.S. Pat. Nos. 2,264,744 and 3,128,137 combination chair and tackle box structures are disclosed which may be carried by fishermen from one location to another as an integral unit. In U.S. Pat. No. 3,230,006 another structure is shown, also adapted to be used by fishermen, which provides both a chair and a refrigerated tackle box. In U.S. Pat. No. 3,290,086 another integral structure is shown providing both a foldable chair and a collapsable storage box. U.S. Pat. No. 3,014,760 teaches a combination golf cart and chair. The present invention is related to improvements in such chair and hand truck combinations.

Accordingly, it is a general object of the present invention to provide an improved chair and hand truck combination.

More specifically, it is an object of the present invention to provide a chair and hand truck combination upon which an ice chest or cooler may be manually set and removed with facility.

Another object of the invention is to provide a chair and hand truck combination which may be folded for storage to conserve storage space.

Yet another object of the invention is to provide a chair and hand truck combination which is light in weight and is of simple and economic construction.

SUMMARY OF THE INVENTION

In one form of the invention a chair and hand truck combination is provided comprising a platform upon which a load such as an ice chest may be set and removed, and a pair of wheels at least partially supporting the platform. A back rest is provided extending upwardly from the platform. A pair of arm rests extend above the platform from the back rest.

BRIEF DESCRIPTION OF THE DRAWING

FIG. 2 is another perspective view of the chair and hand truck combination shown in FIG. 1 but without the ice chest.

FIG. 3 is a perspective view of the chair and hand truck combination shown in FIG. 2 in a folded configuration for storage.

DETAILED DESCRIPTION OF THE DRAWING

Figure 1:
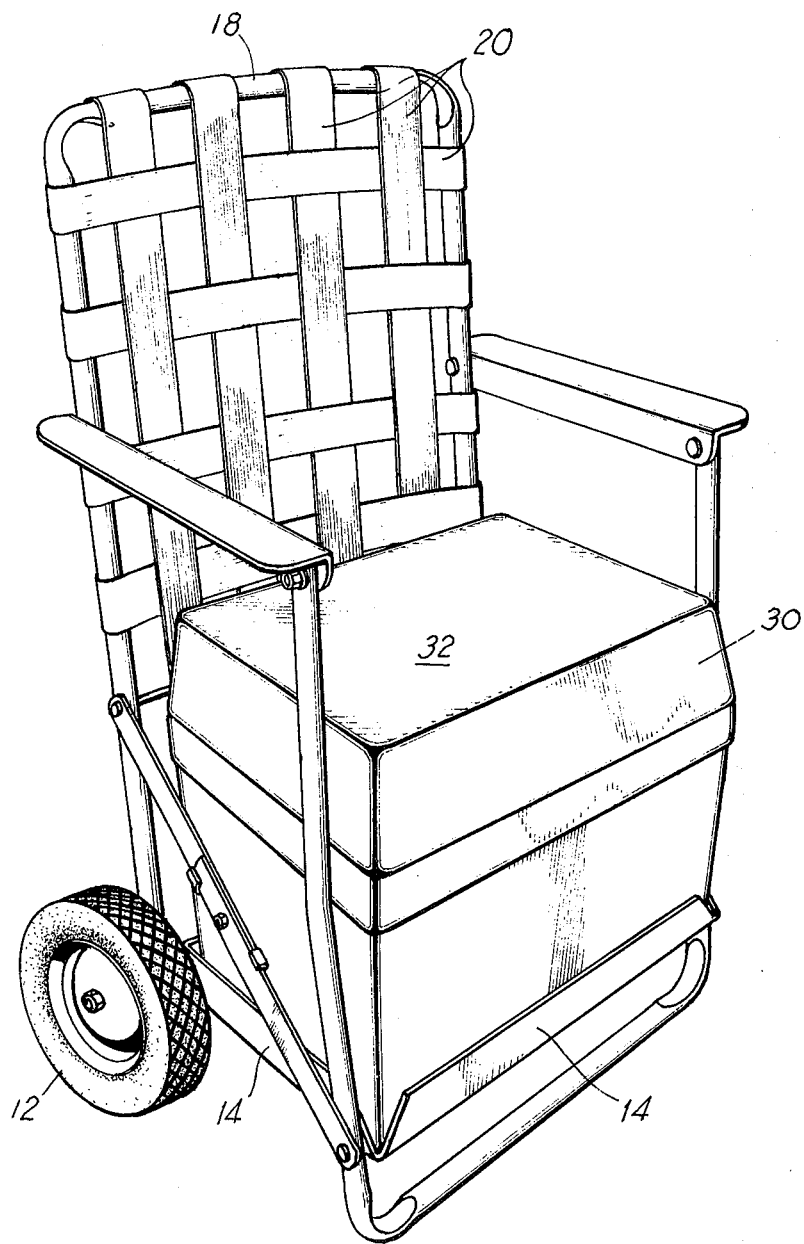
FIG. 1 is a perspective view of a chair and hand truck combination embodying principles of the invention in one preferred form which combination is shown with an ice chest set thereupon.

Referring now in more detail to the drawing, there is shown a chair and hand truck combination embodying principles of the invention in one preferred form and including an axle 10 upon which a pair of wheels 12 are mounted. The axle is journalled through two of four flanges 14 which project upwardly from a platform 15. The platform and flanges here are of unitary structure, preferably formed from a sheet of light weight metal such as aluminum. Axle 10 is also journalled through lower end portions of an inverted U-shaped back rest frame member 18 upon which a lattice work of flexible strips of material 20 are secured. It will be noted that the upper corners of frame 18 are arcuate and are themselves uncovered by the strips of material in order to provide an arcuate hand gripping surface for manipulating the combination.

A U-shaped leg structure 22 is also pivotably mounted to platform 15. A pair of angles 24 are mounted to both the top of the U-shaped leg member and to the back rest frame member to serve as arm rests. Two pairs of braces 26 are pivotably secured to both one another, to the back rest frame member, and to the U-shaped leg member. A pair of stops 28 project from each of the pairs of braces straddling a pivot pin 30 to which each brace is pivoted. These stops serve to limit folding movement of the braces in well known breakable brace fashion.

In FIG. 1 the chair and hand truck combination is seen to be carrying an ice chest or cooler 30 of conventional size and shape having a top or lid 32. The ice chest is seen to be set upon platform 15 within the bounds of flanges 14 which serve to limit sliding movement of the chest atop the platform. The ice chest may be easily removed by gripping side ledges thereof and lifting it off of the chair and hand truck combination. When set upon the platform the chest top provides the chair seat. Comparison of FIGS. 2 and 3 show that once the ice chest is removed the combination may be folded for storage.

We thus see that a chair and hand truck combination is provided which is light in weight and of simple and economic manufacture. The combination is foldable for storage purposes and is adapted to receive and support an ice chest or other box or load for transportation. In this manner, both the chair itself as well as the ice chest or other load may be carried as for example to a picnic ground, as one unit or load. The top 32 of the ice chest provides a seat for the chair which may be covered with additional insulating materials, where desired. The back rest serves both to support the chest in a conveying mood when tilted rearwardly and also to provide a rest for the back of a human sitting in the chair upon the chest.

It should be understood that the just described embodiment merely illustrates principles of the invention in one form. Many modifications may, of course, be made to this specific embodiment without departure from the spirit and scope of the invention as set forth in the following claims.

What is claimed is:
1. A portable chair and ice chest combination comprising:
   a. a flat rigidd rectangular platform for normally being disposed adjacent to the ground in a horizontal position above the ground;
   b. spaced wheels mounted for rotation about a transverse axis, said wheels being respectively mounted on said platform adjacent the rear corners thereof, said wheels being adapted to engage the ground for supporting the rear portion of said platform and for permitting said platform to be pivoted about said axis from its normal horizontal position to an upwardly extending position;
   c. a back pivotally mounted to said rear portion of said platform for remaining upright as said platform is pivoted to its outwardly, horizontal extending position;
   d. means connected between said back and said platform for holding said back in its upright position when said platform is in its normal horizontal position;

e. a rigid ice chest removeably carried by said platform, said ice chest having a horizontally disposed upper surface on which a person may sit in a normal position;

f. a pair of spaced opposed arms pivotally mounted by their rear end portions respectively to intermediate portions of said back, said arms normally extending forwardly of said back and parallel to each other and being pivotable to upwardly extending positions adjacent to the upper portion of said back; and g. rigid front leg means pivotally connected to said platform forwardly of said wheels and pivotally connected to said arms forwardly of said back, said rigid means being respectively disposed outwardly of the sides of said chest when said chest is carried on said platform for arresting lateral movement of said chest on said platform and for providing support for said arms.

2. The structure defined in claim 1 including a transverse axle for said wheels and wherein said back includes a U shaped frame member, said axle passing through the end portions of said U shaped frame and through said platform.

3. The structure defined in claim 1 wherein said arms are secured to said back at positions above said upper surface so that they provide arm rests for the person seated on said upper surface.

4. The structure defined in claim 1 wherein said platform includes upwardly extending flanges along the edges of said platform for confining the bottom portion of said chest to prevent appreciable movement of said chest when it is carried by said platform and an axle passing through said flanges for rotatably receiving said wheels, outwardly of said flanges.

5. The structure defined in claim 1 wherein said rigid means includes a U shaped leg structure, the opposed legs of which pass adjacent said chest and are pivotally mounted to the arms and the platform, the portion of said leg structure, which joins said opposed legs, passing beneath said platform to provide support on the ground for the forward portion of said platform.

6. The structure defined in claim 1 wherein said first mentioned means includes foldable braces extending from positions adjacent the forward edge portions of said platform, upwardly and rearwardly to intermediate portions of said back.

* * * * *